(12) United States Patent
Goulart et al.

(10) Patent No.: US 8,264,529 B2
(45) Date of Patent: Sep. 11, 2012

(54) CAMERA POD THAT CAPTURES IMAGES OR VIDEO WHEN TRIGGERED BY A MOBILE DEVICE

(75) Inventors: Valerie Goulart, Seattle, WA (US); Andrea Small, Seattle, WA (US); Sinclair Temple, Seattle, WA (US); Patrick Carney, Seattle, WA (US); Maura Collins, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 717 days.

(21) Appl. No.: 12/393,006

(22) Filed: Feb. 25, 2009

(65) Prior Publication Data
US 2010/0214398 A1    Aug. 26, 2010

(51) Int. Cl.
*H04N 7/18* (2006.01)
(52) U.S. Cl. ............ 348/61; 348/14.02; 348/14.05; 348/14.12
(58) Field of Classification Search ......... 348/231.99, 348/231.3, 231.4, 231.9
See application file for complete search history.

(56) References Cited

U.S. PATENT DOCUMENTS

| | | | |
|---|---|---|---|
| 2002/0131773 A1* | 9/2002 | Bigler | 396/58 |
| 2003/0106053 A1* | 6/2003 | Sih et al. | 725/25 |
| 2005/0231357 A1* | 10/2005 | Kanayama et al. | 340/539.13 |
| 2006/0022816 A1* | 2/2006 | Yukawa | 340/521 |
| 2007/0242131 A1* | 10/2007 | Sanz-Pastor et al. | 348/14.02 |
| 2008/0129498 A1* | 6/2008 | Howarter et al. | 340/541 |
| 2008/0165272 A1* | 7/2008 | Toguchi | 348/348 |
| 2008/0252722 A1* | 10/2008 | Wang et al. | 348/143 |
| 2009/0104934 A1* | 4/2009 | Jeong et al. | 455/556.1 |
| 2010/0118179 A1* | 5/2010 | Ciudad et al. | 348/371 |
| 2010/0208120 A1* | 8/2010 | Schnell | 348/333.02 |

* cited by examiner

*Primary Examiner* — Djenane Bayard

(57) ABSTRACT

The present invention provides methods and systems for remotely recording an image using a mobile device. In one embodiment, a user transmits a message using a mobile device to activate a camera pod to record an image. The user makes adjustments to the settings of the camera pod using the mobile device, and in some instances, initiates a trigger sequence using the mobile device. The camera pod records the image and transmits the image to the mobile device, enabling the user to preview the image. In some instances, the camera pod transmits the image to a storage server, where it is stored in an album. In one embodiment, the storage server creates a webpage with the captured visual record that the user can retrieve using a personal computer.

41 Claims, 12 Drawing Sheets

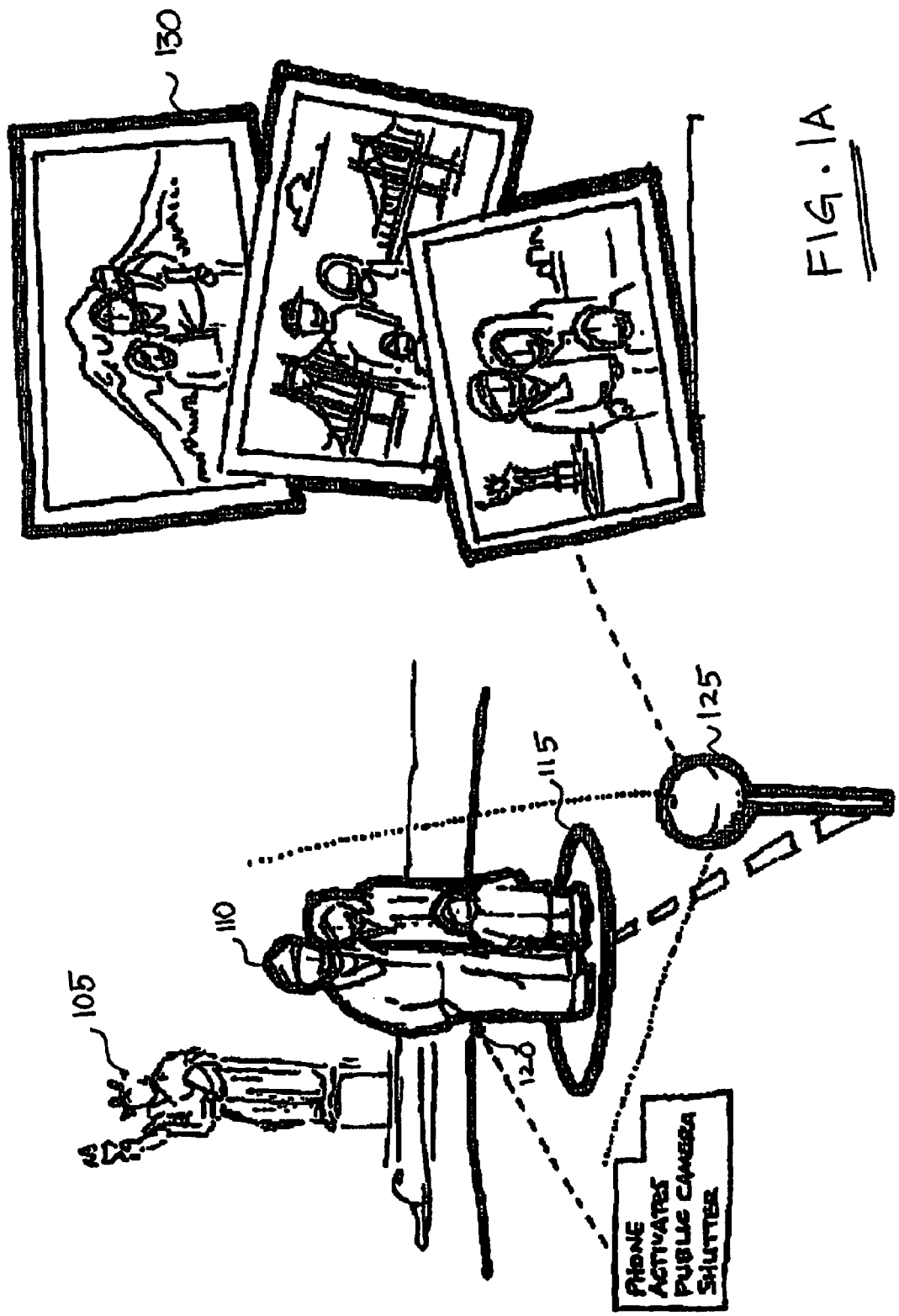

CAMERA POD THAT CAPTURES IMAGES OR VIDEO WHEN TRIGGERED BY A MOBILE DEVICE

BACKGROUND

People use cameras to capture pictures in public or tourist locations in order to save mementos of their trips to such locations. People also use cameras to capture memorable events, such as graduations, weddings, business meetings, conferences, etc. Often, a camera owner would like to capture a picture of an entire group, such as of a family, a group of friends, a group of business colleagues, etc. For example, a father may want to take a picture of his family in front of El Capitan in Yosemite National Park. As another example, a graduate may want a picture with all of her friends in their graduation robes. In such a scenario, the camera owner has a limited number of options to get the entire group in the picture. One option is to hand the camera to a stranger to take the picture. However, the ability of the stranger to take a good picture is not guaranteed, because the stranger may not have an aptitude for taking pictures, may not be able to accurately operate the user's camera, or may not be advantageously positioned with respect to the group and the surrounding scenery in order to a capture a compelling picture. In some situations, the stranger may damage or even steal the camera. Another option is for a camera owner to use the camera in an automatic timed-picture mode. The camera may be placed at a particular location where it will take an automatic picture at the end of a countdown sequence. The timed-mode approach to group picture taking is cumbersome, however, because it is often difficult for the user to find a good location to place the camera to capture the entire group. Additionally, the user has to physically operate the camera to start the count-down sequence and rush back to the group before the end of the countdown sequence. During this process, the camera may shift or other people may walk into the field of the picture. As a last resort, of course, the camera owner may take a picture of the group. Unfortunately, when the camera owner takes the picture, the owner is excluded from the picture.

BRIEF DESCRIPTION OF THE DRAWINGS

FIG. 1A depicts a representative environment in which a mobile device is used to remotely control a camera pod to capture a picture or video of an individual or group.

DETAILED DESCRIPTION

Figure 1B:
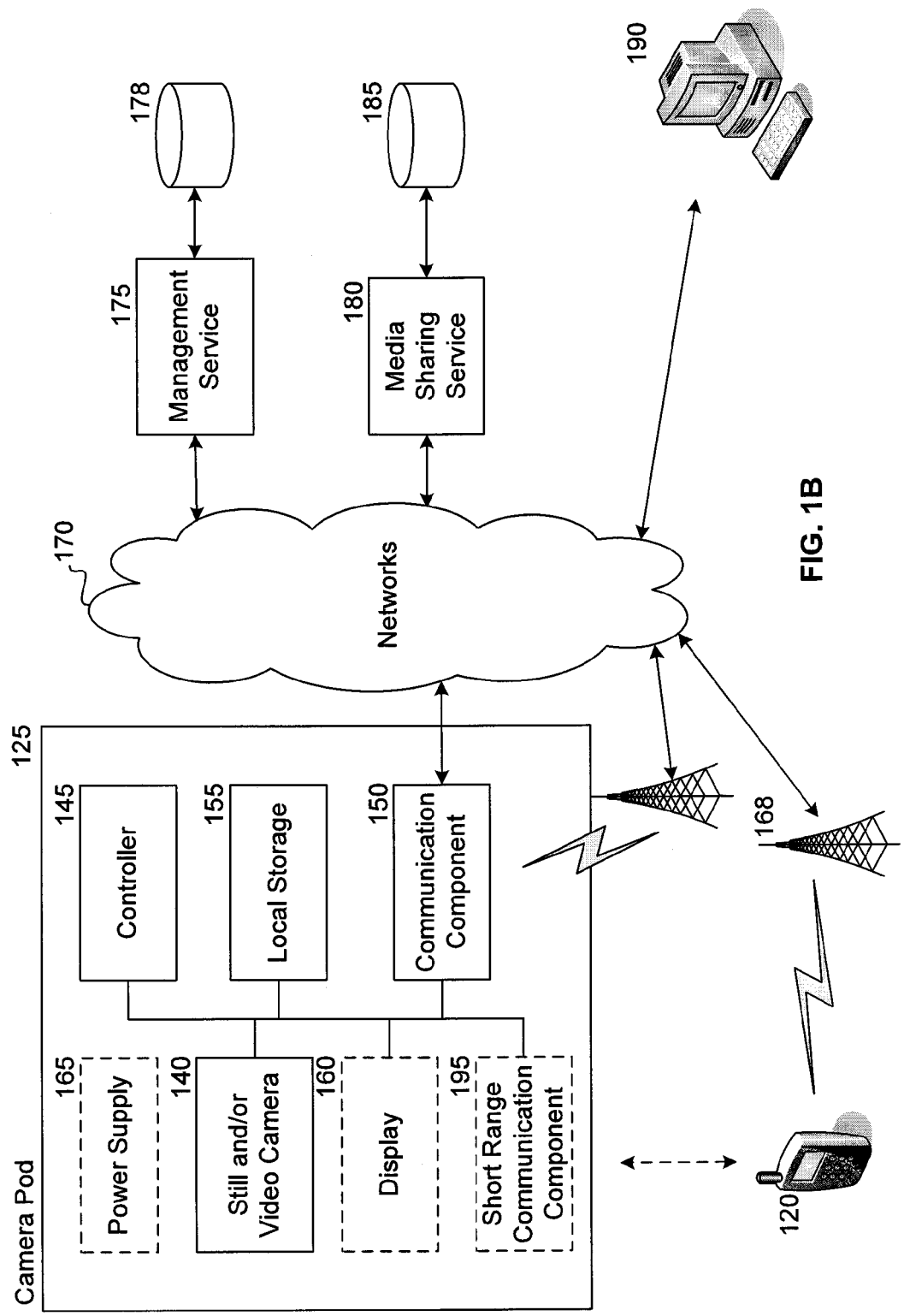
FIG. 1B is a block diagram of a system that uses a signal from a mobile device to trigger the capture of a picture or video from a camera pod.

A system and method that allows a mobile device to remotely control a camera pod in order to capture a visual record of the user of the mobile device is disclosed. The mobile device may be a cell phone, a personal digital assistant (PDA), a portable email device (e.g., a Blackberry), a portable media player, or any other device having wireless communication capability. The camera pod is an enclosed unit that includes a camera, a controller, and a communication component. The camera pod may be installed at popular locations where people are likely to want to take pictures or videos, such as tourist destinations, public thoroughfares, popular landmarks, interesting viewpoints, etc. The location could also be temporary, such as a wedding or a sporting event (e.g. the Olympics). A group or individual wanting to capture a visual record at a camera pod positions themselves in front of the pod. An individual then uses a mobile device to send a command, such as an SMS message, to the camera pod in order to cause a camera in the camera pod to capture a picture or a video of the individual and/or group. A countdown timer, a visual display, or an audible cue (e.g., "say cheese") from the camera pod provides an indication to the user of when the visual record will be captured. The visual record may be sent to the mobile device user and/or the visual record may be stored for subsequent access by the mobile device user.

A composition sequence may be implemented before capturing the visual record. In some embodiments, the composition sequence allows the user to adjust the framing, focus, zoom, number of pictures or length of video, or other aspects of the picture or video that the camera pod will capture. The user of the mobile device may adjust the framing through a series of SMS messages or through a live video feed that is provided by the camera pod to the mobile device display of the user. Upon completion of the composition sequence, the camera pod captures the visual record of the user and any group with the user.

In some instances, after capturing the visual record, the visual record is transmitted to the mobile device to enable the user to view the picture or video. In some instances, the user may be prompted to share the visual record with other people using the mobile device's networking capabilities (e.g., Bluetooth, infra-red, WiFi, SMS or email messaging etc.). In some instances, the captured visual record is transmitted to a media sharing service. The visual record is cataloged by the service based on a mobile device identifier (e.g., mobile device address or number). A user can retrieve the captured visual record from the media sharing service by using, for example, a personal computer to access a webpage or other user interface.

By enabling a user to remotely control a camera pod, the user can ensure that everyone in a group is included in the captured visual record. Additionally, since the camera pod may have a high resolution camera and a predetermined focal point and field of view, the captured visual record may be of higher quality than the user may be able to achieve with his/her own camera. Since the user controls the camera pod using his/her mobile device, he/she does not have to rely upon a stranger to operate a camera in order to take pictures or videos. Moreover, since the system associates the captured visual record with an identifier of the mobile device to enable subsequent access by the user, the user is relieved of the hassle of frequently downloading pictures from a personal camera.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

FIG. 1A depicts a representative environment in which a mobile device 120 is used to remotely control a camera pod 125 to capture a picture or video of an individual or of a group, such as a family. In FIG. 1A, a user 110 and the user's family have traveled to a location where a camera pod 125 has been installed. The camera pod 125 has been positioned in such a manner that it can record an image of the user 110 along with a background feature 105 that may be of historical, picturesque, or other significance. For example, in the depicted example the camera pod has been positioned so that a group standing in a designated location 115 will result in a picture or video that captures both the entire group and the Statue of Liberty. A camera in the camera pod may be adjusted so that the focal point of the camera lens coincides with the designated location, ensuring that all group members at the designated location will remain in focus. In some cases, the designated location 115 may be specified on the ground by a circle, a line, an arrow, or other graphic that allows a user and other group members to readily know where to sit or stand.

In order to initiate the picture or video capture process, the user 110 of the mobile device 120 uses the mobile device to transmit a message to a system that manages the camera pod 125 and other camera pods. For example, the camera pod 125 may have a trigger initiation code (e.g., an email address, a phone number, an SMS short-code, etc.) displayed on it. A user of the mobile device may send a message (e.g., an SMS message) to the system, indicating that the camera pod associated with that trigger initiation code should be triggered. In some instances, the trigger initiation code may also be presented in the form of a bar code or other unique identifier affixed on the camera pod 125. In some instances, the mobile device may acquire the trigger initiation code via near-field communication or other short-range communication, such as RFID, Bluetooth, WiFi, WiMax, etc. For example, the camera pod and mobile devices may each incorporate near-field communication components enabling the mobile device user to physically tap his or her mobile device to a designated location on the camera pod, initiating exchange of the trigger initiation code and/or other information between the devices. For more information regarding use of near-field communications in this manner, please see PCT Application Serial No. PCT/US08/54793, entitled DATA EXCHANGE INITIATED BY TAPPING DEVICE, filed 22 Feb. 2008, which is incorporated herein in its entirety by this reference. The user may use a camera in the mobile device 120 to take a picture of the bar code and transmit the picture to a generic SMS number associated with the camera pod service to indicate that the camera pod associated with that bar code should be triggered.

In some instances, the camera pod detects nearby mobile devices (e.g., mobile devices located within a 50 ft radius of the camera pod) when such mobile devices are in a discoverable mode. A mobile device is in a discoverable mode, when for example, the owner of the mobile device activates an "allow me to be discovered" feature of the mobile device's Bluetooth or WiFi capability. The camera pod then transmits a message to the discovered mobile device inviting the owner of the mobile device to, for example, a photo opportunity. In an illustrative example, the camera pod, upon discovering a nearby mobile device, sends the following SMS message to the mobile device: "Hey, you're 10 ft from a photo opportunity. Interested?"

Upon receipt of the message, the system sends a trigger command to the camera pod associated with the email address. The trigger command directs the camera pod to capture an image or a video 130. Once the visual record has been captured by the camera pod, the system may transmit the visual record to the mobile device 120, enabling the user to immediately view the picture or video. Alternatively or in addition to transmitting the visual record to the mobile device, the system may upload the picture or video to a media sharing system such as a photo-sharing website. On a delayed basis, the user may thus access the media sharing system in order to view the visual record. In some instances, in addition to transmitting the captured visual record, the camera pod may use a display screen (e.g., an LCD screen) to provide a preview or sample of the captured visual record to the entire group of people.

Additionally, in some instances, the camera pod may include more than one camera, with each camera strategically positioned to capture a different view (or the same view from a different angle) of the location. The multiple cameras may also be used to provide, for example, a consolidated panoramic view of the location. In such instances, the user may receive multiple visual records (e.g., multiple-view shots, panorama-view shots, etc.).

FIG. 1B is a block diagram of a system that uses a signal from a mobile device 120 to trigger the capture of a picture or video from a camera pod 125. The camera pod is an enclosed unit that includes one or more still and/or video camera(s) 140, a controller 145, and a communication component 150. The still and/or video camera(s) may be any digital camera having a fixed or adjustable lens for recording still photographs or videos. In some instances, the camera includes a microphone (not shown) to enable the camera to capture audio in addition to still images or video. Additionally, in some instances, the camera pod includes an optical flash device or external lighting (not shown in FIG. 1B) to provide additional illumination as needed during the capture of a visual record.

The camera or cameras 140 are coupled to the controller 145 and a local storage area 155 via a bus or other control lines. The controller 145 is a computing device (e.g., a PID microcontroller) to perform operations in response to instructions received by the camera pod. For example, as will be described in additional detail herein, in response to a trigger command received at the camera pod, the controller may initiate a countdown process and provide a display of the countdown before triggering the camera 140. Pictures or videos that are captured by the camera are temporarily stored in a local storage area 155. Local storage area may be a solid-state memory (e.g., flash memory) or may be media-based storage (e.g., a hard drive or optical drive).

To enable messages and visual records to be transmitted to and from the camera pod 125, the camera pod includes a communication component 150. In some embodiments, the communication component 150 is a wireless communication component (e.g., a wireless transceiver) that enables wireless data communication with a wireless network such as a cell network 168 or a WiFi or WiMax network (not shown). In some embodiments, the communication component 150 is a wired communication component (e.g., a local area network router) that enables data communication through networks 170. Networks 170 may be the Internet, a private network, a public network, a peer-to-peer network, or a combination of any of the foregoing. In addition to transmitting captured visual record data from the camera pod, the communication component 150 receives messages or commands transmitted by devices or services that are external to the camera pod.

To enable messages and visual records to be transmitted to and from the mobile device, the camera pod may include a short-range communication component 195, by which it communicates directly with the mobile device. In some embodiments, the short-range communication component 195 may be a wireless communication component (e.g., a wireless transceiver) that enables wireless data communication with a nearby mobile device, such as near field communications such as RFID, Wi-Fi, Bluetooth, etc.

The communication component 150 allows the camera pod 125 to communicate with one or more external services. In particular, the camera pod may send messages and data to, and receive messages and data from, a management service 175. The management service 175 coordinates communication between mobile devices 120 and a network of camera pods 125, and may operate on one or more servers. As will be described in greater detail herein, the management service receives commands from a mobile device and sends commands to an appropriate camera pod. The management service also receives visual records from a camera pod and either forwards the visual records to mobile devices, or stores the records in a fashion that the mobile device users can subsequently access. For example, the management service is connected to a storage medium 178. The storage medium 178 may store information about a mobile device (e.g., a device address, and IMSI number, an SMS address, etc.), as well as one or more visual records associated with the mobile device. Examples of a storage medium include optical disks, magnetic disks, or semiconductor based memory.

In some embodiments, in addition to or in lieu of storing data and visual records in storage medium 178, the management service 175 may transmit the data and visual records to a media-sharing service 180 that operates on one or more servers. The media-sharing service 180 may be operated by the same party as the management service, or may be a service operated by a different party. Visual records that are transmitted to the image service may be stored in a storage medium 185, similar to storage medium 178. It will be appreciated that the management service 175 may exclusively store visual records received from camera pods, the image service 180 may exclusively store visual records received from camera pods, or both the management service and the image service may store visual records.

In some embodiments, the camera pod 125 includes its own power supply 165 so that the camera pod may be installed in locations where a power connection is non-existent or would be prohibitively expensive. For example, the power supply 165 may be a solar panel array that charges a rechargeable battery in the camera pod. In other instances, the power supply may be replaced with an AC-to-DC converter which, when connected to an industrial or domestic power outlet, provides power to the camera pod.

The camera pod may also include one or more display elements 160, such as a digital countdown timer, an LCD screen (e.g., for messages and/or displaying a sample of the visual record to the user after the user captures the visual record), status lights (e.g., red, yellow, green) or other elements that may be used to convey information to a user. The display element or elements may provide instructions to a user about how to use the camera pod, or may provide a countdown display so that the user knows when the camera is about to be triggered.

A user can use a mobile device 120 to remotely trigger the camera pod 155 and cause the camera 140 to capture a picture or video. As will be described in additional detail herein, a message is sent from the mobile device to an address associated with the camera pod that is in proximity to the mobile device. The message or the address includes or reflects a trigger authorization code to indicate the appropriate camera pod to be activated. The management service 175 receives the message from the user's mobile device and sends a trigger command to the appropriate camera pod 125 via the network. In response to the trigger command, the camera 140 captures a picture or video of the user and anyone around the user. The picture of video is sent to the management service 175 where it is stored in association with a unique identifier for the user, forwarded to the user's mobile device 120, and/or forwarded to the image service 180 where it is stored in association with a unique identifier for the user. In this fashion, the user is able to receive a high-quality visual image that commemorates the user's visit to the location of the camera pod. If the visual record is stored by the management service 175 or the image service 180, the user is able to subsequently access the visual record via a web interface or other user interface. The interface to access the stored visual record may be accessed from a computer 190, such as via a web browser application.

The mobile device may be a cell phone, a personal digital assistant (PDA), a portable email device (e.g., a Blackberry), a portable media player, or any other device having wireless communication capability. Wireless communication capability includes, but is not limited to, user voice and data communication capabilities in accordance with technical standards such as GSM, CDMA, TDMA, UMA/GAN, capabilities conforming to 3G standard for mobile networking, Bluetooth® technology, WiMAX, etc. It is noted that additional examples of mobile devices, as understood by people of ordinary skill in the art, are suitable for use in implementing the techniques described herein.

The previous discussion provided a brief, general description of a suitable environment in which the system can be implemented. Although not required, aspects of the invention are described herein in the general context of computer-executable instructions, such as routines executed by a general-purpose data processing device, e.g., a wireless device, server computer or personal computer. Those skilled in the relevant art will appreciate that the invention can be practiced with other communications, data processing, or computer system configurations, including: Internet appliances, hand-held devices (including personal digital assistants (PDAs) and digital music players), all manner of mobile phones, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor. Aspects of the invention may be stored or distributed on computer-readable media, including magnetically or optically readable computer discs, hard-wired or preprogrammed chips (e.g., EEPROM semiconductor chips), or other data storage media. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Figure 2:
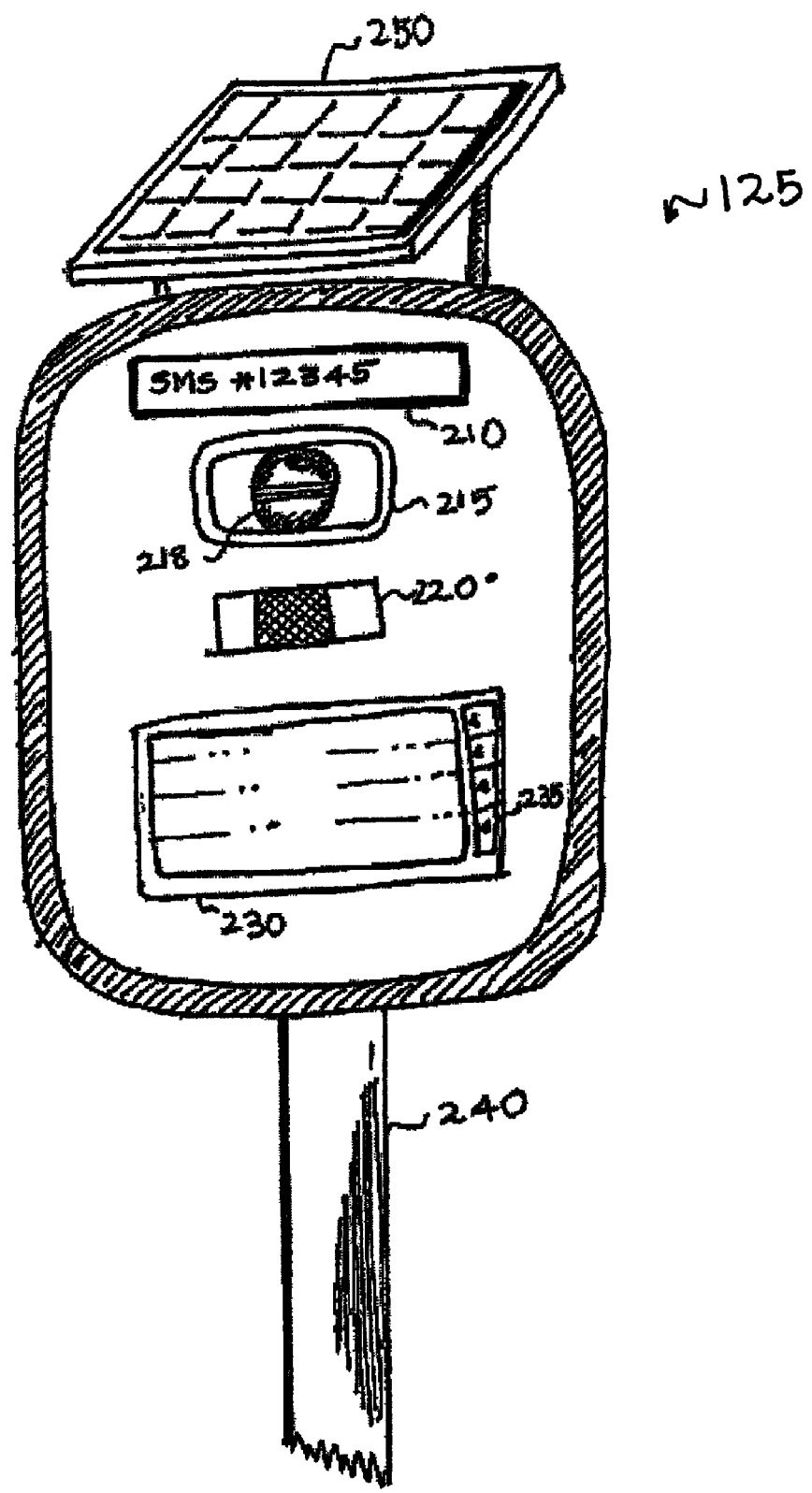
FIG. 2 is a perspective view of one embodiment of a camera pod.

FIG. 2 is a perspective view of one embodiment of a camera pod 125. The components of the camera pod are protected by shielding 205 to protect the components from damage (e.g., water damages, dust, etc.) and from vandalism. The camera pod, as discussed above, may include a power supply to enable the functioning of the various components. In the embodiment shown in FIG. 2, a solar panel 250 is utilized to supply power to the camera pod 125. The camera pod includes a camera 215 to capture still or video images of the area in front of the camera pod. The camera lens may be protected by a shutter 218, which may be opened during use but remain closed the remainder of the time to protect the lens from damage. There may also be a flash or unattached illumination device associated with the camera pod.

Each camera pod is provided with a unique identifier 210, such as a number, code, email address, or other signature. The management service maintains a registry that correlates to each unique identifier with the location of the corresponding camera pod. The identifier is sent by a mobile device in a message to the management service in order to initiate a picture or video capture process at the corresponding camera pod. In some embodiments, the camera pod may include written user instructions (not shown), such as a sign to inform the user on how to operate the camera pod. The instructions may provide a user guidance on how to initiate the visual record capture process and adjust the capture parameters of the camera pod. The written instructions could be printed or digital depending on the instructions are to be displayed.

To facilitate user interaction with the camera pod, the camera pod may have one or more displays to provide information to the user. For example, a visual indicator 220 may provide information to a user that the camera 215 is ready for operation. In some embodiments, when the user activates the camera pod 125, the visual indicator 220 uses lights of varying colors to indicate the readiness of the camera pod (e.g., a red indicator to indicate that the camera 215 is unavailable, an orange indicator to indicate that the camera 215 is capturing a picture or video, a green indicator to indicate that the camera 215 will start recording in, for example, 5 seconds, etc.). In some embodiments, the visual indicator 220 blinks at certain intervals that reflect the length of time before an image capture will occur (e.g., the visual indicator blinks at 5-second intervals when the camera is activated, and at 1-second intervals when the camera is ready to start recording or about to take a picture, etc.). Other indicators that use visual or audio means to indicate the various modes of operations of the camera pod may be used in lieu of, or in addition to, the visual indicator.

The camera pod may also include a visual display unit 230 to provide the user, for example, detailed instructions or a sample of the image captured by the camera 215. The visual display unit 230, in some instances, is an LCD monitor that can display both still photographs and videos. In some embodiments, the visual display unit 230 includes one or more control keys 235 to enable a user to instruct the camera pod to perform various functions. For example, the user may use one of the control keys 235 to read instructions regarding the usage of the camera pod. In another example, the user may use another of the control keys to control settings of the camera 215 (e.g., pan the camera, zoom in or zoom out, add lighting, etc.). In another example, the user may use still another of the control keys to add embellishments to the image (e.g., adding a picture frame, imposing a customized message over the image, adding picture effects such as black and white, sepia, etc.). One skilled in the art will appreciate that the visual display unit may be used to allow a user to perform other functions related to the camera pod.

The camera pod 125 is installed at its intended location by mounting the pod on a wall or other object, hanging the pod from an overhead support, or utilizing a stand-alone support structure such as a pole 240. In some instances, the support structure houses the various support cables and circuitry necessary for the camera pod 125. (In instances that use a solar panel for power and a wireless communication component, no support cables or circuitry may be necessary.) The mounting of the camera pod may be semi-permanent, meaning that the pod is intended to be fixed in one place for a period of time. Alternatively, a portable mounting structure may be provided which allows the pod to be moved to different locations. For example, a university may own a portable camera pod so that it can be moved to various events where it might be used (e.g., graduations, sporting events, fundraisers, etc.).

Figure 3A:
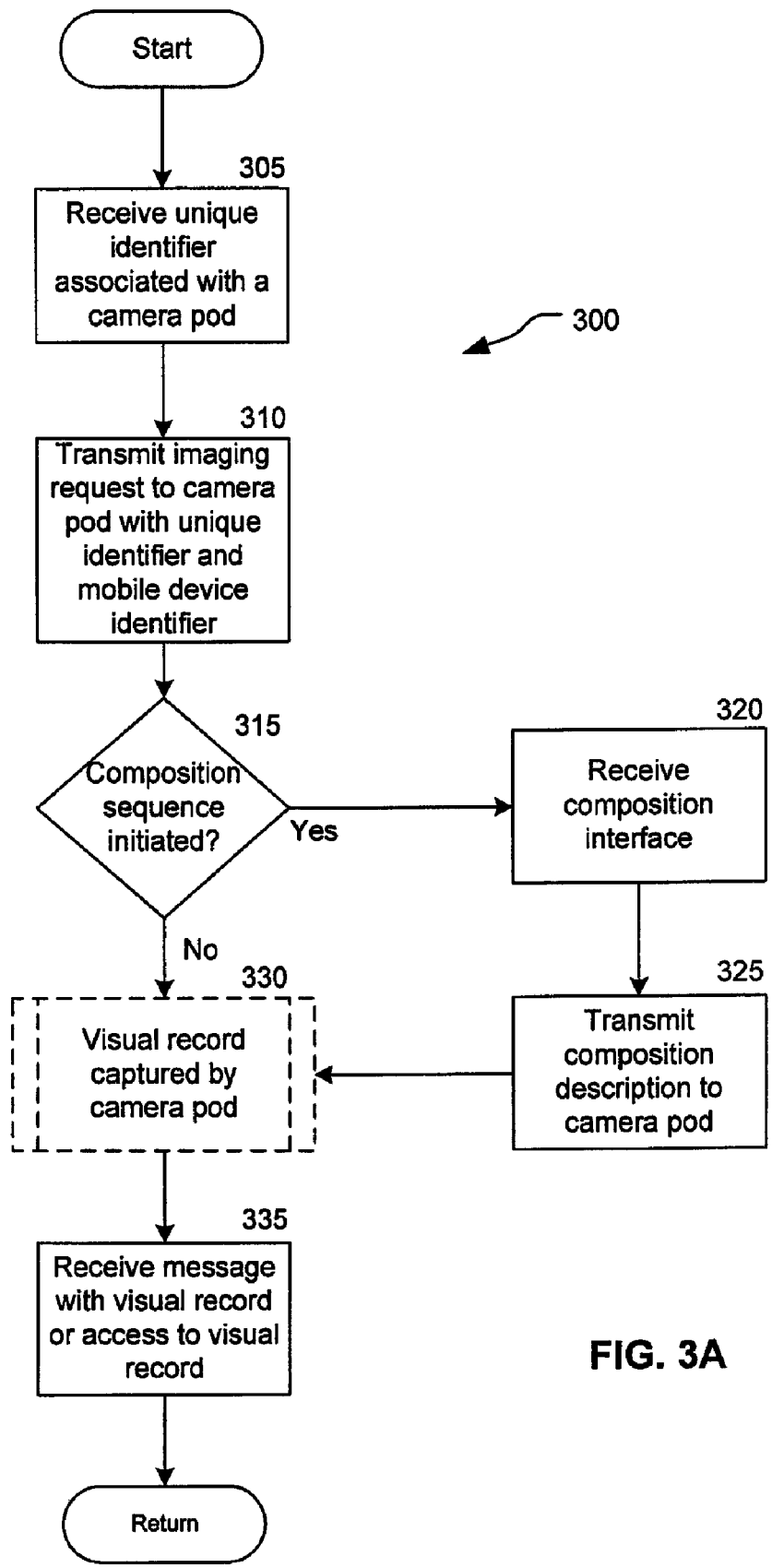
FIG. 3A is a flow diagram of a process of using a mobile device to remotely control a camera pod.
Figure 4A:
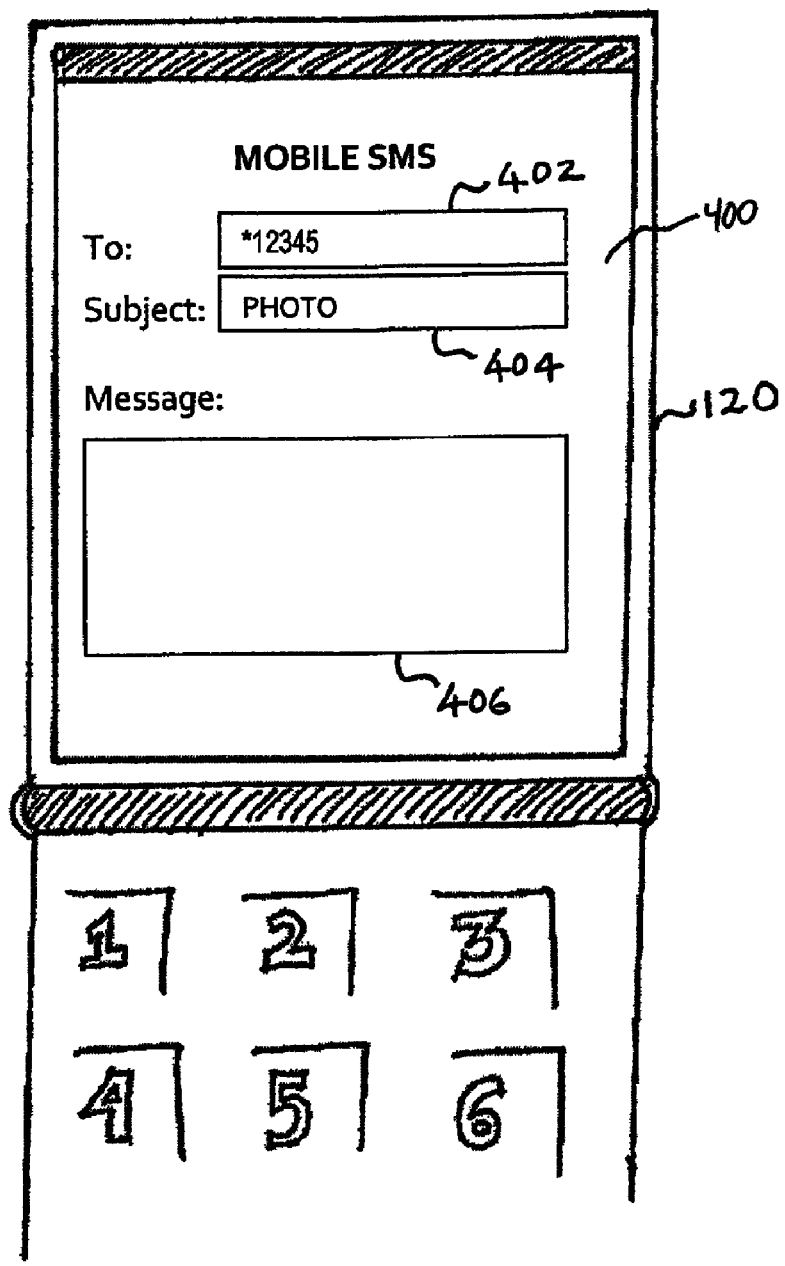
FIGS. 4A-4F are screenshots of a mobile device user interface that allows a mobile device user to interact with a camera pod in order to capture and access pictures and videos.
Figure 4B:
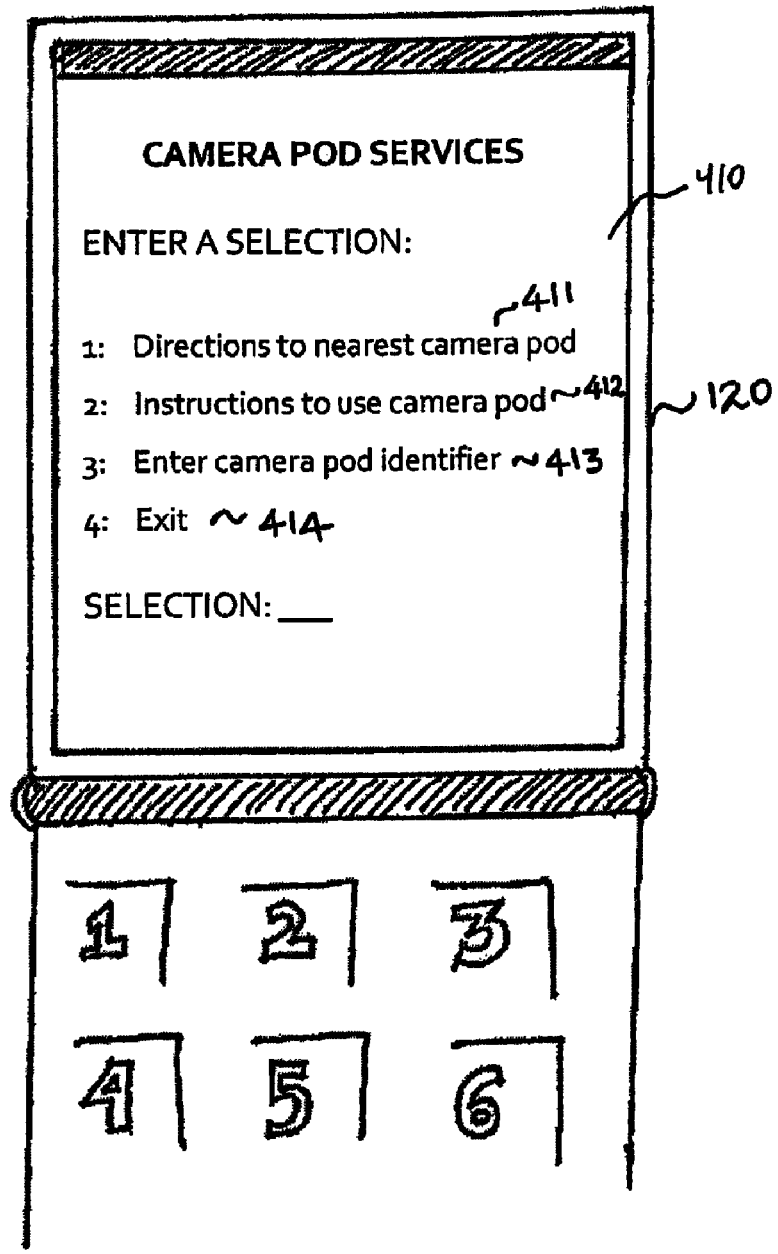

FIG. 3A is a flow diagram of a process 300 implemented by a mobile device 120 to remotely command a camera pod 125 to take actions. At a block 305, the mobile device receives a unique identifier that is associated with a camera pod. As previously described, each camera pod has a unique identifier 210 so that command signals can be addressed to the correct camera pod. The unique identifier may be found by a user on or near a camera pod and entered by a user on the mobile device. For example, FIG. 4A depicts a screenshot of a user interface 400 that depicts a form for generating an SMS message. In the "To" field 402, the user has entered the identifier of the camera pod which acts as an address for the SMS message. In the "Subject:" field 404, the user has specified "photo" to indicate that a photo is to be taken. It will be appreciated that other commands may be specified in the subject field, such as "video" (to take a video), "instructions" (to receive instructions), or other options that may be interpreted by the management service. A message field 406 may be blank, or may specify additional details about the requested service. As another example of a form for entering a unique identifier of a camera pod, FIG. 4B depicts a mobile web interface 410 that may be generated by the management service and presented to the user on the mobile phone. The mobile web interface provides a number of options to the user, including a first option 411 on how to locate the nearest camera pod, a second option 412 to receive instructions on how to use a camera pod, a third option 413 to allow the user to enter the camera pod identifier, and a fourth option 414 to exit the interface. The user may select the third option and enter the unique identifier of a camera pod. In still another example, a user may send an email message to a common address regardless of the camera pod (e.g., "takephoto@camerapods.com"), but include in a subject line the unique identifier of the camera pod. Whether using the SMS message depicted in FIG. 4A, the mobile web interface depicted in FIG. 4B, or another method, the user enters the camera pod identifier that is in proximity to the user.

Returning to FIG. 3A, at a block 310 the mobile device transmits the imaging request to the management service. The imaging request includes the camera pod identifier as well as a mobile device identifier. If sending an SMS message, the mobile device may be identified by the "from" field that is automatically populated by the SMS messaging application. If entering the imaging request from a mobile web form, the user may be required to enter a user name or a phone number. Alternatively, the mobile device may be identified by an IP address, IMSI number, or other unique identifier. The mobile device identifier is used by the management service to indicate an ownership of or association with captured visual records.

At a decision block 315, the process 300 forks depending on whether a composition sequence is initiated by the camera pod system. If a composition sequence is not initiated, then at a block 330 the camera pod captures a picture or video of the user. As will be described in additional detail with respect to FIG. 3B, the capture of the visual record may be preceded by a countdown and/or other visual or audio indication that the picture/video is about to be taken. For example, a countdown sequence may be presented on the mobile device and/or on the camera pod. As another example, an indicator such as a blinking light may be provided on the camera pod to indicate the readiness of the camera and precisely when the camera will capture the visual record.

Figure 4C:
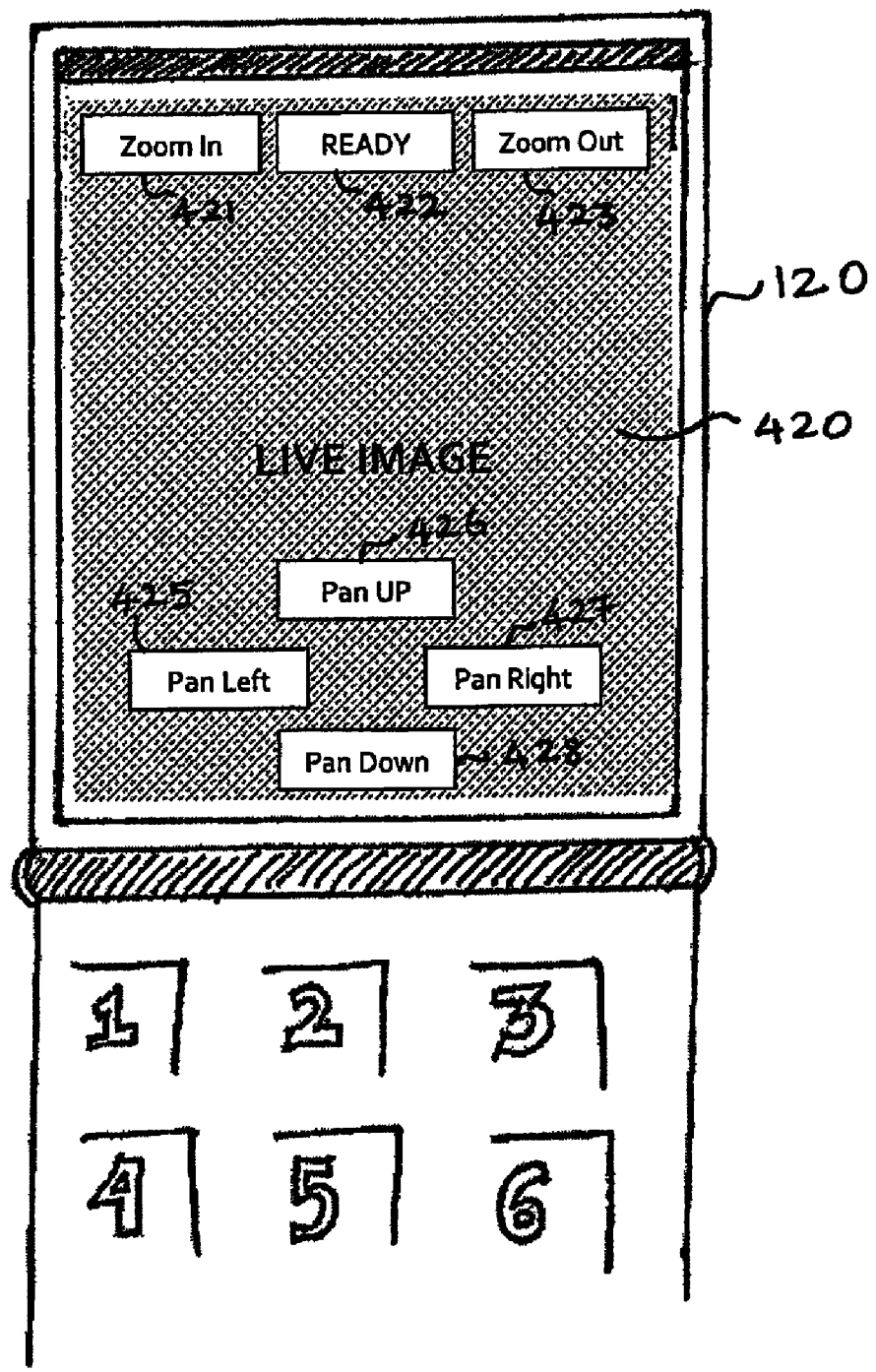

If a composition sequence has been initiated by the camera pod, processing continues at a block 320. At a block 320, the mobile device receives a composition interface from the camera pod system. The composition interface allows the mobile device user to specify or set various parameters that are associated with the capture of the visual record. FIG. 4C depicts an example of a composition interface 420 that may be generated by the management service and presented to the user on the mobile device. In the example, the mobile device receives a live image transmitted by the camera pod. (Prior to receiving the live image, the management service determines whether the mobile device is capable of receiving video feeds. For example, the management service detects whether the mobile device has 3G networking capability.) Based on the live feed, the user can make adjustments to the composition of the picture, such as by zooming in or out using controls 421 and 423, panning up or down using controls 426 and 428, and panning left or right using controls 425 and 427. Because the user receives a live image, any changes based on the user's adjustments are instantly reflected in the live image. Once the user has selected the image composition that they desire, the user can select control 422 to indicate that the image is ready to be captured. In some instances, the user may use existing features offered by the mobile device's native camera or video application (e.g., inbuilt zoom controls, panning controls, etc.) to receive and adjust the live image received from the camera pod.

In some instances, the management service may transmit additional options or messages to the mobile device as part of the composition sequence. For example, the composition interface 420 may allow a user to specify how many pictures are to be captured or how long a video is to be recorded. The user may be allowed to select various image options, such as selecting a use of a "panoramic" or a "fisheye" lens on the camera pod. As another example, the user may be presented with an option to emboss a photo or video with a pre-set message (e.g., a message over a photo that indicates "In Front of the Statue of Liberty!"). The user may also have an option to enter personalized text or a tag for the photo or video (e.g. "Mary was here!" as the caption, tagged with "Mark's Birthday"). In still another example, the user may be presented an option to add a frame to the image or change styles (like sepia tone, black and white, etc.). Some of the options presented by the management service must be presented prior to a visual record being captured (e.g., those pertaining to parameters associated with the visual record capture), whereas other options presented by the management service may be presented either prior to or after a visual record has been captured (e.g., embossing or adding a frame). In some instances, a brightness sensor included in the camera pod detects the ambient brightness and uses the detected brightness to automatically adjust the aperture and/or shutter speed of the camera. Such adjustments may be made automatically, without the user having to make the adjustments through the composition interface 420.

Returning to FIG. 3A, coincident with the user making adjustments to the composition of the image using the composition interface, at a block 325 the composition description is provided to the management service. At block 330, the camera pod captures a picture or video of the user. As previously discussed, such capture may be preceded by the presentation of a countdown or other visual indicator to the user.

Figure 4D:
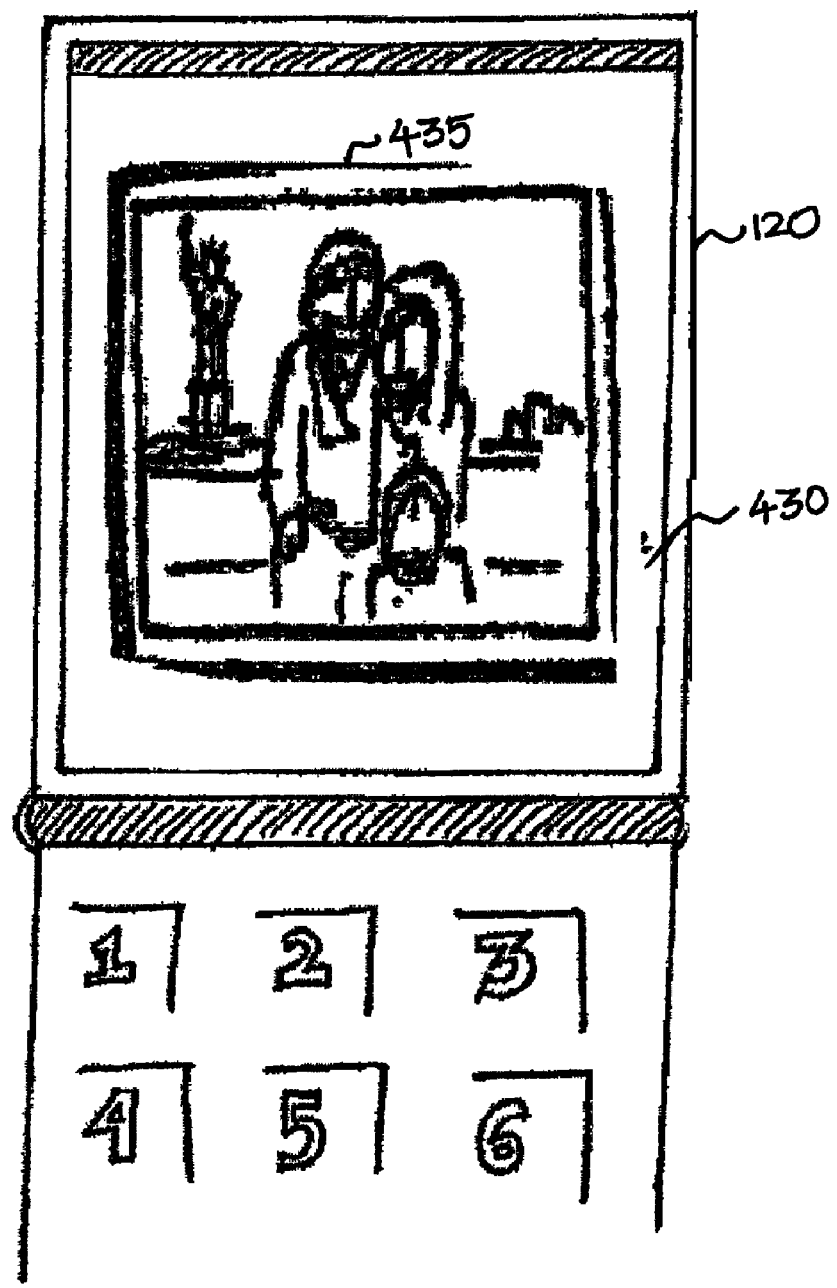
Figure 4E:
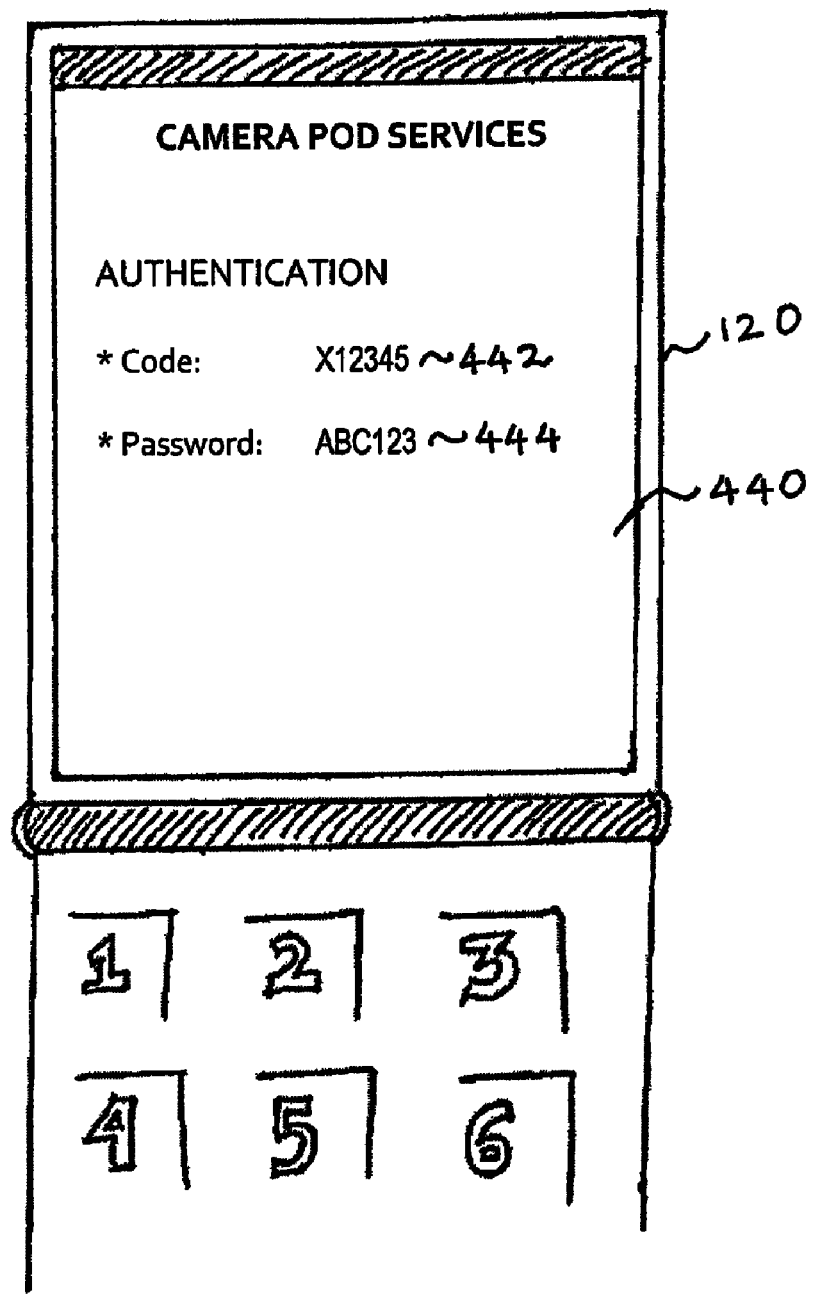

Once a visual record has been captured, at a block 335 the user receives access to the visual record in one or more ways. For example, FIG. 4D depicts a mobile interface 430 in which the captured picture or video 453 is displayed to the user. The picture or video is emailed or otherwise caused to be downloaded to the mobile device by the management service. Alternatively, the user may be provided a means to access the visual record from a media-sharing service. FIG. 4E depicts an email or other message 440 in which an authentication code 442 and a password 444 has been provided to the mobile device 120. In addition, the user may be provided with a URL (not shown) or other indication where the captured visual record has been stored. The authentication code and password may be used by the user to retrieve the captured visual record from a media-sharing service. In some instances, the user can retrieve the image by entering the authentication code in a network browser of a user's computer to access the captured visual record at a website.

Figure 4F:
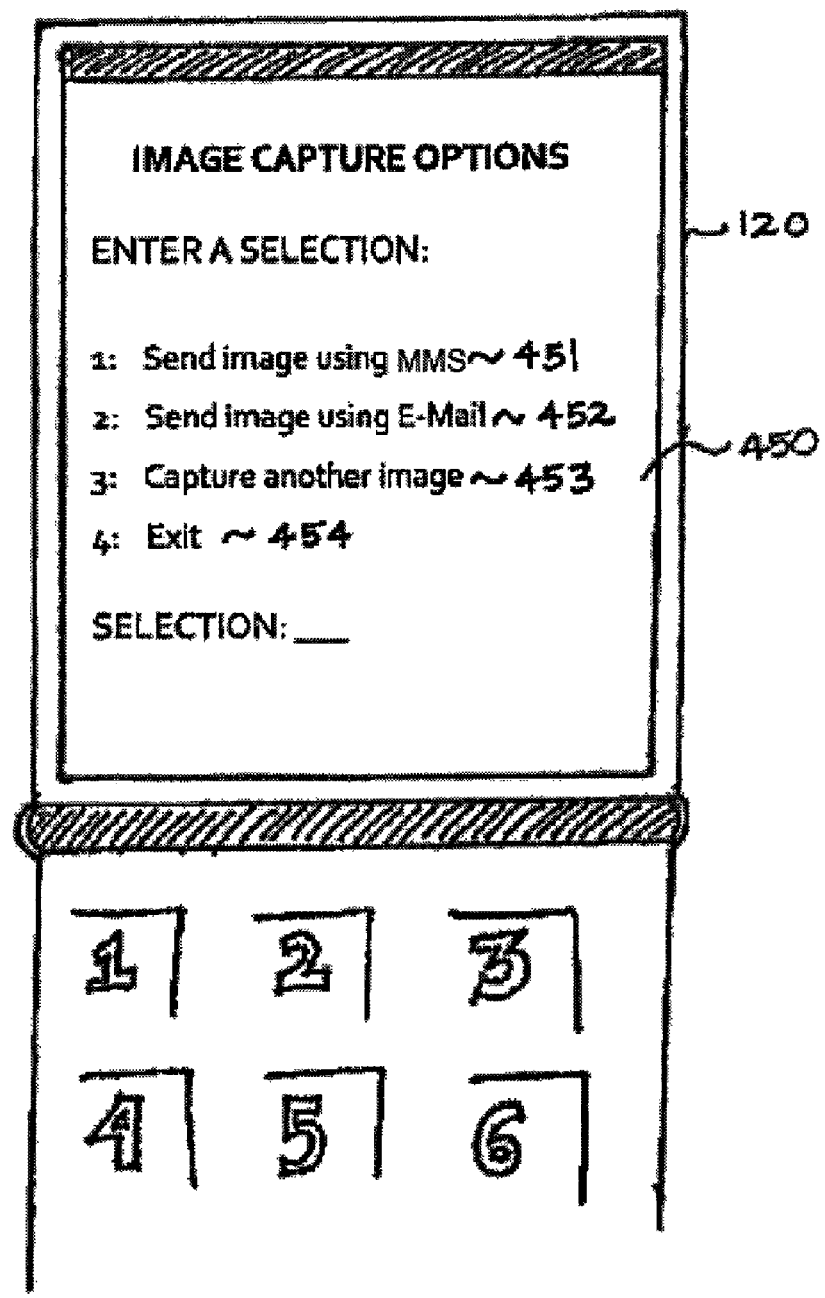

After a visual record has been captured, the management system may also allow the user to specify one or more actions that can be taken on the visual record. FIG. 4F is a representative options interface 450 that may be generated by the management service and presented to the user on the mobile device. The options interface 450 presents a number of actions that may be performed on the visual record. For example, a first action 451 allows the user to send the image/video using an MMS message to one or more mobile devices, a second action 452 allows the user to send the image/video using an e-mail to one or more email addresses, and a third action 453 allows the user to have the camera pod capture another visual record. The user may also select an exit option 454, to exit the options interface 450.

Using the techniques described herein, the management service thereby provides the user a number of different options to view the visual record immediately or to defer viewing the record until a later time. Allowing a user to receive instant access or delayed access is a significant benefit to those who use the service. Process 300 may be repeated by the mobile device as necessary to capture a desired number of visual records.

In some instances, the management service may halt the visual record capture process when the management service perceives a time-out condition. In one example, the time-out condition may occur when the mobile device does not perform any action to proceed with capturing a visual record for a given period of time after transmitting the imaging request. In another example, the time-out condition may occur when the mobile device does not perform any action after receiving the composition interface. Alternatively, or in addition to the time-out conditions, the management service may also limit the total number of visual records captured by the user during any given session. For example, each mobile device may be limited to two images or two videos within a 24 hour period.

Figure 3B:
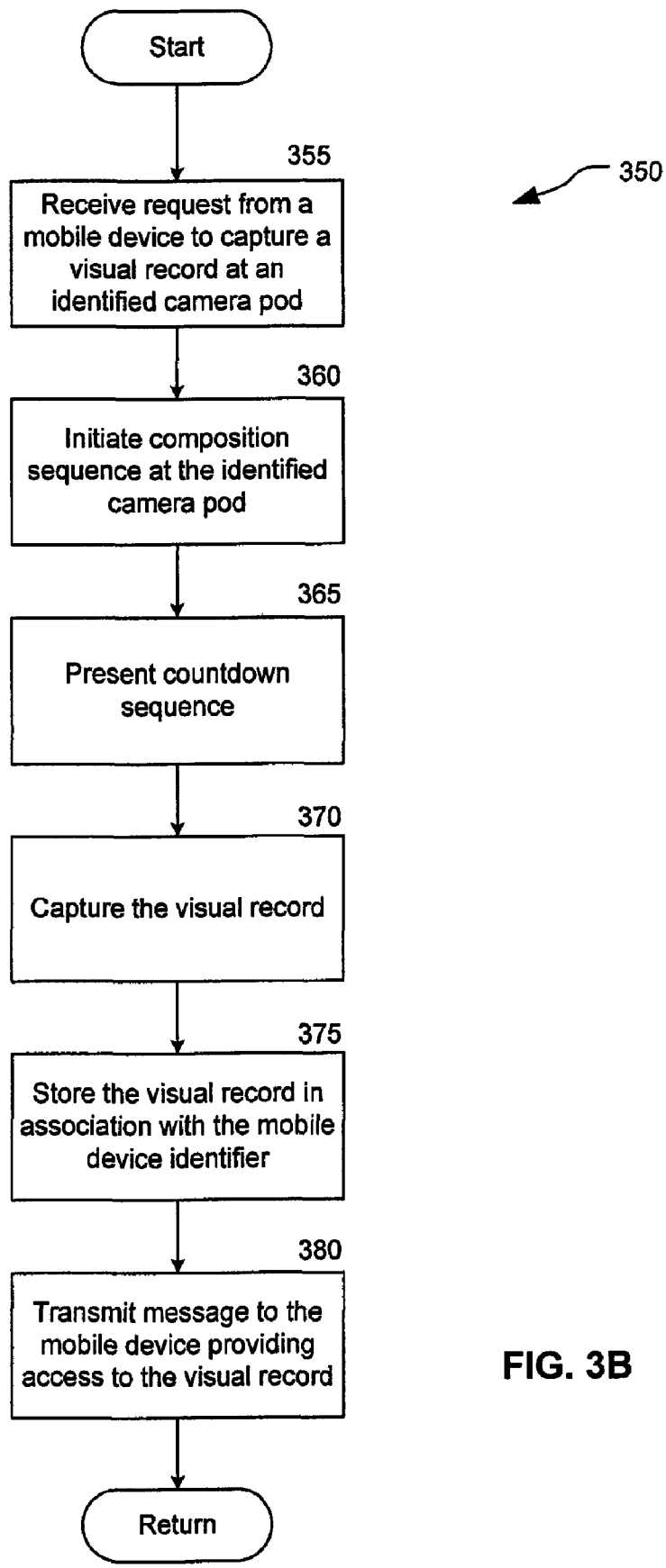
FIG. 3B is a flow diagram of a process implemented at the camera pod to capture pictures and videos when remotely initiated by a mobile device.

FIG. 3B is a flow diagram of a process 350 implemented by management service 175 in response to commands received from a mobile device 125. At a block 355, the management service receives a request from a mobile device to capture a visual record at an identified camera pod. As noted herein, each camera pod has a unique identifier that is included in the imaging request received from the mobile device. By including the unique identifier, the management service is able to readily determine the camera pod that should be directed to capture a visual record of the user.

At a block 360, the management system may initiate a composition sequence. The management system may always initiate a composition sequence, may sometimes initiate a composition sequence (e.g., when requested by a user), or may never initiate a composition sequence (e.g., in particularly high traffic locations, the camera pod maximize the number of visual records that are captured within a certain time period by skipping a composition sequence and immediately capturing a picture or video). As previously described, the composition sequence may be as simple as querying a user as to the number of photos they would like to take or the length of time that a video should be captured, or as complex as forwarding a live feed from the camera pod to the mobile device to allow the user to frame the photo in real-time. A snapshot can be recorded or a video recording can be started or stopped by pressing a number during a live transmission.

After completion of a composition sequence, at a block 365 the camera pod may begin a countdown sequence before capturing the visual image. For example, the camera pod may utilize the visual indicator to indicate the readiness of the camera (e.g., the visual indicator could rapidly blink a red-colored light to indicate that the camera will start recording in 5 seconds). Or the camera pod may have an LED display that counts backwards from "10" down to "1" at which point a picture is taken or video filming begins. In lieu of an automatic countdown sequence, the management service may allow the user to trigger the capture of the visual image using the mobile device. For example, the management system may send a message to the mobile device that indicates that the user can manually commence a countdown sequence by entering a first code in response to the message, or immediately capture a visual record by entering a second code.

After completion of the composition sequence (if performed) and countdown sequence (if any), at a block 370 the camera pod captures a picture or video of the user. The picture or video may be temporarily stored on the camera pod before being transmitted to the management service, or may be immediately transmitted to the management service after capture. At a block 375, the management service stores the visual record in association with the mobile device identifier (e.g., number, email, IMSI, etc.). The mobile device identifier may be used by a user to subsequently access the stored visual record. In some instances, the management service also stores the visual record in association with a location tag that corresponds to the location of the camera pod that captured the visual record. The location tag enables the user to, for example, sort the visual records based on location. As previously described, the visual record may be stored in local data storage 178 or stored by a media sharing service 180. In some instances, the visual record is stored in an album. For example, the management service or the media-sharing service creates a first album for a particular mobile device address and stores visual records associated with that particular mobile address in the first album. In another example, the management service or the media-sharing service creates sub-albums within each album based on specific criteria (e.g., visual records recorded on a particular day, type of visual record, visual records recorded from a particular location, visual records recorded from a particular user, etc.).

At a block 380, the management service transmits a message to the mobile device that provides the user access to the visual record. In some instances, the message may contain the captured photo and/or video. In some instances, the message may contain a link to a website where the user may access the captured visual record. The message may further contain an authentication code that the user uses when accessing the website to retrieve and view the captured visual record. In some instances, the user may directly forward the received photo and/or video to other people (e.g., other people in the captured photo and/or video). In other instances, the user may share the authentication code with other people to enable them to access the website and retrieve and view the captured visual record.

After transmission of the message to the mobile device, the management service process 350 halts. The process may be repeated each time that a request to capture a visual record is received from a mobile device.

Figure 5:
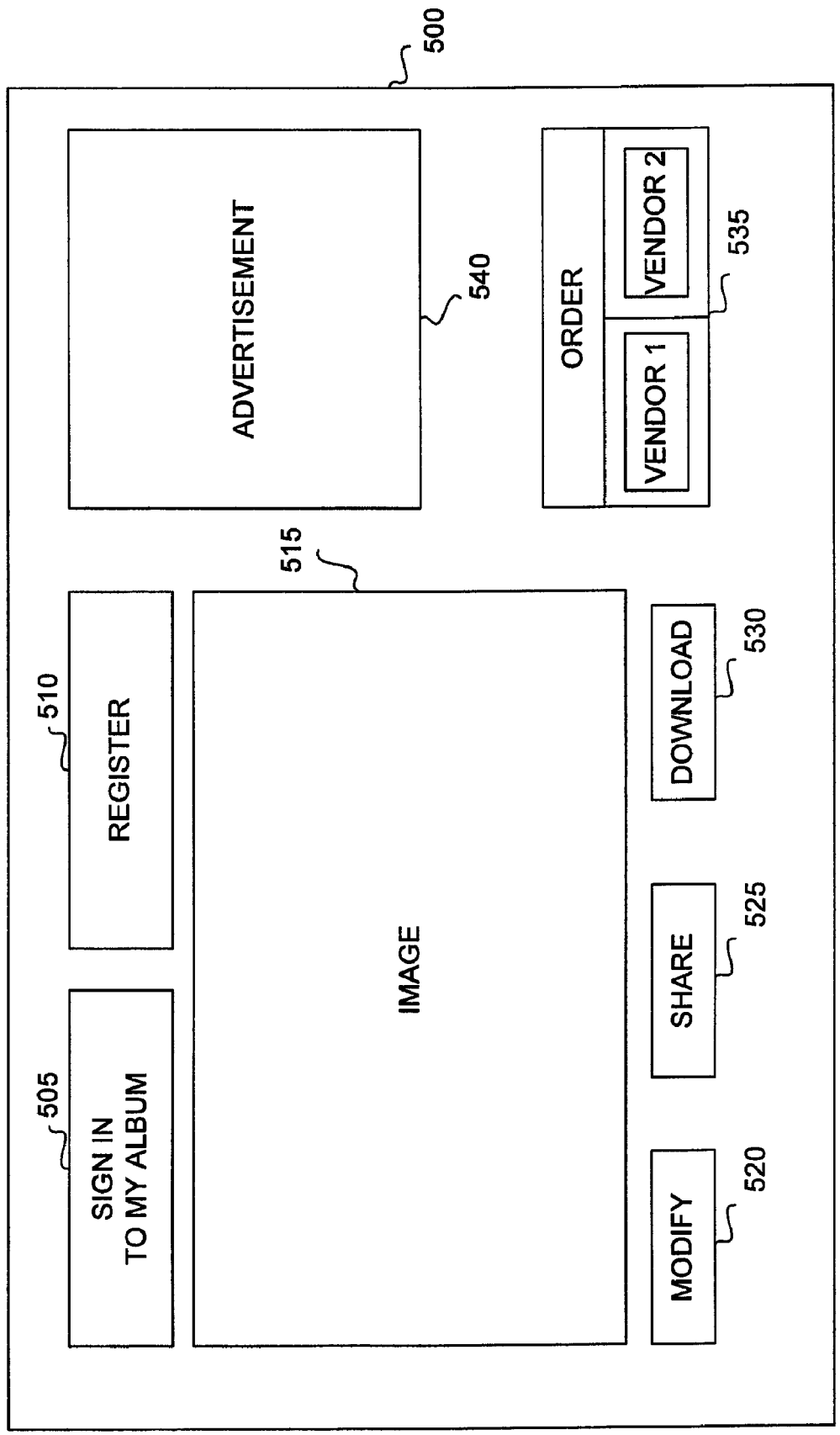
FIG. 5 is a screenshot of a representative webpage that allows a mobile device user to access captured pictures and videos.

FIG. 5 is a screenshot of a representative webpage 500, such as might be provided by the media-sharing service 180, that allows a mobile device user to access captured pictures and videos. To access stored visual records, a user may be required to first sign in by selecting either a "sign in" option 505 (for existing users) or a "register" option 510 (for new users). As part of the sign-in process, the user may be required to enter their mobile device identifier and/or an authorization code that they received during the visual record capture process or from another user who shared the access code with the user. Since visual records are cataloged by the mobile device identifier (e.g., mobile device number, mobile device address, etc.) that was collected from the mobile device, providing the mobile device identifier allows the media-sharing service to locate all visual records that are associated with that device. The webpage displays all archived images or albums associated with the user's mobile device when the user signs into the account. The visual records or album structure are displayed in an image region 515 of the webpage.

The webpage 500 provides a variety of options to the user to manipulate the visual record. For example, the user may select a modify button 520 to modify the visual record to add a border, change the color balance, crop the visual record, add embossed text, etc. The user may share the visual record with other users, such as by email or by forwarding a link to the visual record, by selecting a share button 525. The user may download the visual record to a local storage medium associated with the user's computer by selecting a download button 530.

The operator of the media-sharing service may monetize the captured visual record in a variety of ways. For example, the webpage 500 includes buttons 535 to allow a user to order prints of pictures, merchandise (e.g., coffee mugs, etc.), or DVDs of videos by choosing a particular vendor. The webpage also includes an advertising region 540 to enable the operator of the media-sharing service to display one or more advertisements. In some instances, the operator of the media-sharing service may display targeted advertisements by using relevant information retrieved, for example, from the visual record. As another example of monetizing the disclosed system, the operator of the management service may charge the user for each message sent or received by the user, thus increasing revenue based on the transmission of messages containing media. In some instances, the management service may include advertisements in the messages to further add revenue to the transaction. For example, the menu depicted in FIG. 4B could include a fifth option that indicates "Enter 5 to find the nearest Starbucks® location."

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc. Software or firmware to implement the techniques introduced here may be stored on a machine-readable medium and may be executed by one or more general-purpose or special-purpose programmable microprocessors. A "machine-readable medium," as the term is used herein, includes any mechanism that stores information in a form accessible by a machine (e.g., a computer, network device, personal digital assistant (PDA), any device with a set of one or more processors, etc.). For example, a machine-accessible medium includes recordable/non-recordable media (e.g., read-only memory (ROM), random access memory (RAM); magnetic disk storage media, optical storage media, flash memory devices, etc.).

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

We claim:

1. A method of using a camera pod to capture and provide a visual record to a user of a mobile device at the camera pod location, the method comprising:
   receiving a request transmitted by a mobile device to capture a visual record of a user of the mobile device at a known location of a camera pod, wherein the request is transmitted from the mobile device via a wireless telecommunications network and includes an identifier associated with the mobile device;
   transmitting a composition request to the mobile device via the wireless telecommunications network, the composition request allowing a user to specify one or more parameters to control a camera in the camera pod;
   receiving a response from the mobile device via the wireless telecommunications network, the response indicative of the one or more parameters specified by the user;
   triggering the camera in the camera pod at the known location to capture the visual record of the mobile device user, the captured visual record reflective of the one or more parameters specified by the user;
   associating the captured visual record with the mobile device identifier; and
   allowing the mobile device user to access the captured visual record.

2. The method of claim 1, wherein the visual record is a still photograph.

3. The method of claim 1, wherein the visual record is a video.

4. The method of claim 1, further comprising triggering an audio recorder in the camera pod to capture an audio record of the mobile device user.

5. The method of claim 1, wherein allowing the mobile device user to access the captured visual record comprises transmitting the captured visual record to the mobile device.

6. The method of claim 1, wherein allowing the mobile device user to access the captured visual record comprises allowing the user to access a website through which the user can view the visual record.

7. The method of claim 6, wherein the user must first provide the identifier in order to access the visual record.

8. The method of claim 7, wherein the identifier is a phone number.

9. The method of claim 6, further comprising transmitting an authentication code to the mobile device of the user, wherein the user must first enter the authentication code in order to access the visual record.

10. The method of claim 1, wherein transmitting the composition request comprises: generating an interface to allow the user of the mobile device to specify the one or more parameters associated with the capture of the visual record.

11. The method of claim 10, wherein the one or more parameters are selected from the group comprising a zoom parameter, a pan parameter, a number of pictures parameter, or a length of video parameter.

12. The method of claim 10, wherein the interface includes a live video feed.

13. The method of claim 1, further comprising:
   delaying the triggering of the camera pod at the known location until the receipt of a response from the mobile device indicating that the visual record should be captured.

14. The method of claim 1, further comprising executing a countdown sequence prior to capturing the visual record.

15. The method of claim 14, wherein the countdown sequence is a countdown timer.

16. The method of claim 14, wherein the countdown sequence is a visual indicator on the camera pod to indicate a readiness of the camera pod to capture the visual record.

17. The method of claim 14, wherein the countdown sequence is an auditory indicator on the camera pod to indicate a readiness of the camera pod to capture the visual record.

18. A method of using a mobile device to remotely control a camera pod to capture a visual record of a mobile device user, the method comprising:
   transmitting from a mobile device to a camera pod service a message indicating a request to use a camera pod to capture a visual record of the mobile device user, the message containing information identifying the camera pod and the mobile device, wherein the mobile device utilizes a wireless telecommunications network to transmit the request message;
   receiving from the camera pod service a composition interface through the wireless telecommunications network, the composition interface allowing the mobile device user to specify one or more parameters to control a camera in the camera pod;
   transmitting to the camera pod service, utilizing the wireless telecommunication network, a user-specified one or more parameters associated with the capture of the visual record, wherein the camera pod captures the visual record in accordance with the user-specified one or more parameters; and
   receiving from the camera pod service, through the wireless telecommunication network, a confirmation of the captured visual record.

19. The method of claim 18, wherein the visual record is a still photograph.

20. The method of claim 19, wherein one of the one or more parameters is a number of still photographs.

21. The method of claim 18, wherein the visual record is a video.

22. The method of claim 21, wherein one of the one or more parameters is a length of video.

23. The method of claim 18, wherein the message is transmitted utilizing a short message service over the wireless telecommunications network.

24. The method of claim 18, wherein one of the one or more parameters is a zoom setting of the camera pod.

25. The method of claim 18, wherein one of the one or more parameters is a pan setting of the camera pod.

26. The method of claim 18, wherein one of the one or more parameters is a type of camera pod lens.

27. The method of claim 18, wherein the confirmation of the captured visual record includes a copy of the captured visual record.

28. The method of claim 18, wherein the confirmation of the captured visual record includes an authentication code.

29. The method of claim 28, wherein the authentication code enables a user of the mobile device to retrieve the captured visual record from a storage service.

30. The method of claim 18, wherein the confirmation includes a link to a storage service that contains the captured visual record.

31. A system for capturing and providing a visual record to a user of a mobile device, the system comprising:
   a camera component configured to capture a visual record of a user upon receipt of a trigger command;
   a management component communicatively coupled to the camera component and configured to:
      receive a request transmitted by a mobile device to capture a visual record of a user of the mobile device at a location of the camera component, wherein the request is transmitted from the mobile device via a wireless telecommunications network and includes an identifier associated with the mobile device;
      transmit a composition request to the mobile device via the wireless telecommunications network, the composition request allowing a user to specify one or more parameters to control the camera component;
      receive a response from the mobile device via the wireless telecommunications network, the response indicative of the one or more parameters specified by the user; and
      send a trigger command to the camera component upon receiving the request, the trigger command causing the camera component to capture a visual record of the user in accordance with the one or more parameters specified by the user; and
   a storage component coupled to the camera component and configured to receive the captured visual record from the camera component and store the captured visual record in association with the mobile device identifier,
   wherein the management component transmits a confirmation message to the mobile device following the capture of the visual record.

32. The system of claim 31, wherein the camera component further comprises a communication component to enable the camera component to transmit the captured visual record to the storage server.

33. The system of claim 32 wherein the communication component is at least one of:
   a first device configured to transmit the captured visual record to the storage component via a wireless telecommunication network; or
   a second device configured to transmit the captured visual record to the storage component via a land network.

34. The system of claim 31, wherein the visual record is a still photograph.

35. The system of claim 31, wherein the visual record is a video.

36. The system of claim 31, wherein the camera component further comprises a visual indicator to indicate a readiness of the camera component to capture the visual record.

37. The system of claim 31, wherein the camera component further comprises a visual display to provide a countdown to the user prior to the capture of the visual record.

38. The system of claim 31, wherein the camera component further comprises a power supply unit.

39. The system of claim 38 wherein the power supply unit is a solar power panel.

40. The system of claim 31, wherein the storage component allows the user to access the captured visual record.

41. The system of claim 31, wherein the storage component is connected to a web server to enable the user to retrieve the captured visual record from the storage server via a website.

* * * * *